United States Patent [19]
Harrell, Jr.

[11] 3,839,241
[45] Oct. 1, 1974

[54] ISOCYANATE-MODIFIED NEOPRENE FOAM PROCESS

[75] Inventor: L. Lamar Harrell, Jr., Wilmington, Del.

[73] Assignee: E. I. du Pont de Nemours and Company, Wilmington, Del.

[22] Filed: June 22, 1973

[21] Appl. No.: 374,249

[52] U.S. Cl. ............... 260/2.5 L, 5/331, 5/361 B, 260/2.5 AT, 260/29.7 N
[51] Int. Cl. .......................................... C08f 47/18
[58] Field of Search ....... 260/2.5 L, 29.7 M, 2.5 AT

[56] References Cited
UNITED STATES PATENTS 3,450,649    6/1969    Youker ........................... 260/2.5 L
3,627,710    12/1971   Crary ............................. 260/2.5 L

*Primary Examiner*—Morton Foelak

[57] ABSTRACT

An improved process for the preparation of polyisocyanate-modified neoprene foams, wherein there is added to neoprene latex a nonionic surfactant and an amine having the formula $RN(CH_2CHR'OH)_2$, R being methyl or ethyl and R' being hydrogen or methyl, and adjusting the pH of the latex from more than about 11.5 to about 10.0–11.5. Instead of adding separately the amine and then a pH-lowering acid, it is possible to add both ingredients simultaneously, or to simply add an appropriate amine salt. The resulting foams have excellent wet compression set and excellent cured resilience and load-bearing capacity.

8 Claims, No Drawings

ISOCYANATE-MODIFIED NEOPRENE FOAM PROCESS

BACKGROUND OF THE INVENTION

This invention relates to an improved process for preparation of neoprene foams reinforced with polyisocyanates.

U.S. Pat. No. 3,450,649 (to Youker) discloses that the incorporation of 10–100 parts of an organic polyisocyanate per 100 parts of elastomer into a latex of a sulfur-curable elastomer, then expanding the latex into a foam leads to low density foams having improved load-bearing characteristics, as compared with foams made from latices not containing a polyisocyanate. Neoprene foams prepared in this manner also have good flame resistance.

Another Youker Patent, U.S. Pat. No. 3,639,301, teaches an improved polyisocyanate modified neoprene foam preparation process, wherein a freshly prepared polychloroprene latex having a pH above 11 is heated at 60°–90°C. until the pH is lowered to the range of 9.5–10.0. Aging neoprene latices at room temperature for a period of several weeks or months also is known to reduce the pH of the latices.

Another pertinent art in this area is U.S. Pat. No. 3,627,710 (to Crary), which teaches a process for reducing the pH of neoprene latices to the range of 9.5–10.8 while maintaining good physical properties of polyisocyanate-modified foams made from such latices. The process requires the addition to the latex of a strong acid salt of certain secondary amines, such as morpholine, diethanolamine, di(2-propanol)amine, etc. The latex, which contains about 50 percent of solids, is creamed either before or after the pH adjustment, the creamed latex containing about 58–60 percent of solids.

High solid latices can also be prepared directly by the polymerization of concentrated chlorobutadiene emulsions according to the processes of U.S. Pat. Nos. 3,651,038 and 3,651,037 (to Snow). Such directly polymerized high solids latices (hereafter, DPHS latices), however, do not respond to the prior art pH-adjustment processes, the resulting foams having undesirably low resilience when cured and low resistance to compression set in a wet, uncured state. Good wet compression set is necessary to avoid deformation of the foam in the demolding step, prior to curing.

There is, therefore, a great need for an efficient process for the preparation of polyisocyanate-reinforced neoprene foams from DPHS latices.

SUMMARY OF THE INVENTION

According to this invention, there is now provided an improved process for the preparation of polyisocyanate-modified neoprene foams, wherein there is added to neoprene latex at least 0.5 part of a nonionic surfactant and about 0.5–2.0 parts, both per hundred parts by weight of latex solids, of an amine having the following Formula (1); and the pH of the latex is adjusted to about 10.0–11.5:

$$RN(CH_2CHR'OH)_2$$

wherein
R is methyl or ethyl, and
R' is hydrogen or methyl.

The addition to the latex of an amine of Formula (1) and adjusting the pH may be combined into a single step.

DETAILED DESCRIPTION OF THE INVENTION

Latices useful in the process of the present invention are either conventional latices, such as those described in the above-cited Crary patent, or DPHS latices, such as those taught in U.S. Pat. Nos. 3,651,038 and 3,651,037. The pH of a freshly prepared conventional latex is about 11–13; that of a DPHS is at least 10.5, preferably about 13. Neoprene latices are made by emulsifying chloroprene in water and polymerizing in the presence of a catalyst, by well-known methods. Foaming is accomplished by mechanically frothing the emulsion by whipping with air and adding a gelling agent, such as potassium silicofluoride. A conventional latex has about 59 percent solids after creaming. A DPHS latex has about 62 percent solids. While conventional latices are usually mercaptan- or sulfur-modified, DPHS latices often are xanthate-modified. The process of the present invention is particularly suitable for DPHS latices.

The polyisocyanate is preferably added at approximately the same time as the gelling agent or shortly before; appreciably earlier addition of the isocyanate may cause premature coagulation and result in a foam product having low load-bearing characteristics. Suitable polyisocyanates include, among others, aromatic diisocyanates such as 2,4- and 2,6-toluene-diisocyanates, 4,4'-methylenebis(phenyl isocyanate), m-phenylenediisocyanate, polymethylenepoly(phenyl isocyanate), and toluenediisocyanate distillation residues having isocyanate functionality greater than 2. Aliphatic diisocyanates such as 4,4'-methylenebis(cyclohexyl isocyanate) and decamethylene-diisocyanate also are useful in the process of the present invention but are less desirable. A polymethylenepoly(phenyl isocyanate) prepared substantially as described in U.S. Pat. No. 2,683,730 and containing about 50 percent by weight of 4,4'-methylenebis(phenyl isocyanate) is particularly suitable. This polyisocyanate is known commercially as "PAPI" (Upjohn Co., Kalamazoo, Mich.). About 10–100 parts by weight of polyisocyanate per 100 parts of elastomer in the latex are used.

Amines of Formula (1) useful in the process of this invention include methyldiethanolamine, ethyldiethanolamine, di(2-hydroxypropyl)methylamine, and di(2-hydroxypropyl)ethylamine. Methyldiethanolamine and ethyldiethanolamine are preferred. It is to be noted that a small amount of a secondary amine, such as, for example, diethanolamine, may also be present; this additional amine sometimes is desirable because it occasionally improves the gel quality.

Nonionic surfactants useful in the process of the present invention include condensation products of alkylphenols, fatty alcohols, vegetable oils, carboxylic acids, or carboxylic acid amides with ethylene oxide. Suitable surfactants have a hydrophilic-lipophilic balance (hereinafter, HLB) of about 11–16.5 on a scale from 0 to 20. The HLB scale is well known in the surfactant art, a completely lipophilic material having no hydrophilic properties being assigned the value of 0, and a completely hydrophilic material having the value of 20. The method of calculating HLB is described in Journal of the Society of Cosmetic Chemists, Vol. 1, p. 311 (1949). The nonionic surfactant is added prior to frothing. The presence of a nonionic surfactant is critical to the process of this invention; in its absence, the desirable good properties of the resulting foams are not obtained. It is preferred to use an amount of the nonionic surfactant of up to about 3 parts per hundred parts of latex solids.

In addition to the nonionic surfactant, there may be present in the latex an anionic surfactant in an amount of 0 to about 1 part per 100 parts of latex solids. This surfactant must be one in which the anion is derived from a strong organic acid, for example, a sulfonate or sulfate. A typical suitable anionic surfactant is Aquarex WAQ, which is a mixture of sodium salts of sulfate monoesters of higher fatty alcohols, chiefly lauryl and myristyl derivatives. The anionic surfactant is recommended for the preparation of low density chloroprene foams. It is added prior to frothing.

The amine and the nonionic surfactant are added to the latex before or after frothing but prior to the polyisocyanate addition. The amine and nonionic surfactant may be added separately or first blended and then added in a single step.

The pH adjustment can be accomplished in any convenient manner by introducing into the latex any suitable acid. Weak or strong organic or inorganic acids can be used, including chemical compounds which generate an acid in situ, for example, carbon dioxide. The acid or acidgenerating compound can be added either after the addition of the amine or simultaneously with it. Since simultaneous addition would initially lead to the formation of the corresponding amine salt, it is possible to use salts of the amines of Formula (1) instead of the free amines and acids. Both variants of this process are within the scope of the present invention. When the amine and a strong acid are added separately, the acid should be added in sufficiently dilute form to prevent coagulation of the latex. However, this may cause undesirable dilution of the latex. It is, therefore, preferred to add a strong acid in blend with an amine. The resulting salt can be added at much higher concentrations without causing coagulation, and dilution is minimal.

Suitable acids include, among others, hydrochloric, sulfuric, nitric, phosphoric, benzenesulfonic, hydrofluoric, hydroiodic, trifluoroacetic, and trichloroacetic acids. Hydrochloric acid is the preferred acid in the process of this invention because of its low cost and ready availability. Consequently, methyldiethanolamine hydrochloride and ethyldiethanolamine hydrochloride are the preferred amine salts that can be used in a single step pH adjustment.

Foams prepared by the process of the present invention are particularly suitable for use in pillows, carpet backing, automobile cushions, mattresses, and other applications, where good resilience and high load-bearing capacity are important. These desirable properties can be combined with low foam density, such low density foams being exceptionally well suited for marine use.

This invention is now illustrated by the following examples of certain preferred embodiments thereof, wherein all parts, proportions, and percentages are by weight unless otherwise indicated.

FOAM PREPARATION PROCEDURE

The base compound was prepared by adding to the neoprene latex with good agitation the ingredients in Table I in the order listed. All ingredients down to and including the petrolatum were generally premixed and added to the latex as a mix along with the water which was used to adjust total solids, exclusive of polyisocyanate and gelling agent, to 60.5 percent. The water-soluble materials (Aquarex WAQ Surface Active Agent, nonionics, "Tepidone" Rubber Accelerator, diethanolamine, "Dresinate" 91 Soap Emulsifier, and amines) were then added as aqueous solutions in such a manner that colloidal shock to the latex was eliminated. The water insoluble materials, except "Hydral" 710 Hydrated Aluminum Oxide, were added as colloidal emulsions or dispersons. N,N-Dimethyl-N'-ethylthiourea was used as a 55 percent dispersion. "Mobilcer" A was obtained from the Mobil Oil Co. as a 50 percent dispersion. Thiocarbanilide, antimony oxide, and a masterbatch of "Neozone" D and zinc oxide were ball-milled dispersions prepared according to recipes given in "Neoprene Latex" by J. C. Carl (E. I. du Pont de Nemours and Co. (Inc.)), 1962. "Hydral" 710 was added as a dry powder.

Foams were prepared by frothing the base compound with air in a Hobart Model 100-C mixer equipped with low, intermediate, and high mixing speeds. Both 3-quart and 10-quart bowls with appropriate size whips were used. Frothing to the desired volume was done at the high speed, and the froth was then refined for 6 minutes at intermediate speed. PAPI Polymethylenepolyphenyl Isocyanate was added at low speed and mixed for 1 minute at intermediate speed. Sodium silicofluoride was then added at low speed and mixed at intermediate speed for 1 minute. The froth was then poured into an open mold and the surface smoothed with a scraper.

Most of the foams were prepared at room temperature (70°-75°F.), but higher and lower temperatures can be used. The gelation time decreases as temperature increases, and one skilled in the art recognizes that an adjustment in the amount of gelling agent is required to adjust the gelation time to a practical range. The gelation time represents the time from addition of sodium silicofluoride to the time the froth is completely gelled.

Latex used in Examples 1 and 2 was prepared by substantially the same procedure as Example 2 of U.S. Pat. No. 3,651,037, with the following exceptions:

0.10 part diethylxanthogen disulfide was used instead of 0.1 part dodecyl mercaptan;

57 parts water was used instead of 60 parts;

0.91 part of potassium salt of condensate of formaldehyde and alkyl naphthalene sulfonic acid was used instead of 1.5 parts;

0.1 part dextrose and 0.1 part of potassium sulfite were included in the chloroprene emulsion;

all parts being per 100 parts of chloroprene.

At completion of polymerization the latex was stabilized by the addition of 0.02 part of phenothiazine and 0.022 part of 4-tert.-butyl catechol added as a solution in toluene emulsified in water.

In Example 3 the same latex was used and in addition contained 1.5 part of "Dresinate" 91 Soap Emulsifier (Hercules, Inc.) as postadditive.

TABLE I

| Base Compound[1] | EXAMPLE | | |
|---|---|---|---|
| | 1 | 2 | 3 |
| Neoprene | 100.0 | 100.0 | 100.0 |
| Sodium Lauryl Sulfate[3] | 1.0 | 0.6 | 1.0 |
| Nonionic[4] | 1.5 | — | — |
| Potassium salt of a processed rosin[12] | 1.5 | 1.5 | — |
| Thiocarbanilide | — | — | 1.0 |
| N,N-Dimethyl-N'-ethylthiourea | 2.0 | 1.5 | — |
| Sodium Dibutyldithiocarbamate[5] | 0.42 | 0.32 | 0.47 |
| Diethanolamine | — | — | 0.25 |
| Petrolatum[6] | 2.0 | 2.0 | 0.25 |
| Phenyl-β-naphthylamine[7] | 2.0 | 2.0 | 2.0 |
| Zinc Oxide | 7.5 | 7.5 | 7.5 |
| Antimony Oxide[8] | 5.0 | 5.0 | 5.0 |
| Hydrated Aluminum Oxide[9] | 16.0 | 20.0 | 20.0 |
| Methyldiethanolamine Hydrochloride[10] | — | — | to pH 11.0 |
| Methyldiethanolamine, total[11] | — | 1.7 | 1.75 |
| $CO_2$ | to pH 11.0 | to pH 11.0 | — |
| Additive (see Tables II–IV) | as shown | as shown | as shown |
| Polymethylenepolyphenyl Isocyanate[13] | 20 | 15 | 17.5 |
| Sodium Silicofluoride (gelling agent) | 2.5–3.4 | 3 | 3.5 |

FOOTNOTES FOR TABLE I
[1]% Solids, including additives, is 60.5.
[2]Contains 1.5 parts of "Dresinate" 91, as postadditive.
[3]"Aquarex" WAQ Surface Active Agent, E. I. du Pont de Nemours and Co., Inc.
[4]"Triton" X-100 alkylaryl polyether alcohol, Rohm and Haas Co.
[5]"Tepidone" Rubber Accelerator (47%), E. I. du Pont de Nemours and Co., Inc.
[6]"Mobilcer" A Wax Emulsions, Socony Mobil Oil Co., Inc.
[7]"Neozone" D Rubber Antioxidant, E. I. du Pont de Nemours and Co., Inc.
[8]Harshaw, KR Grade.
[9]"Hydral" Hydrated Aluminum Oxide, Aluminum Company of America.
[10]A 2-molal solution of methyldiethanolamine, 80% neutralized with HCl.
[11]Includes total methyldiethanolamine whether added as the free amine or as the hydrochloride.
[12]"Dresinate" 91 Soap Emulsifier (88%), Hercules, Inc.
[13]PAPI, Polymethylene Polyphenylisocyanate, Upjohn Co.

The wet foams were demolded 45 minutes after the mold was filled, and wet recovery characteristics were determined immediately. The wet foam was compressed rapidly by hand to ≈25 percent of its height, and the pressure was immediately released. Recovery was considered good if the foam recovered completely, fair if recovery was almost complete but slight depressions were left in the surface, and poor if there was an appreciable permanent compression set.

The wet foams were dried and cured for 8 hours at 121°C. in a hot air circulating oven. Dimensions of the cured foam were measured, and volume shrinkage was calculated as a percentage of the mold volume. Density was calculated from the weight of a 2 × 2 × 1 inch test specimen. Physical properties of the foam were determined according to test procedures of ASTM D-1564-71.

The following Tables II – IV present the results of gelation time, wet recovery, and cured foam properties of Examples 1–3. Table II compares the additive methyldiethanolamine of the present invention with diethanolamine of the Crary patent. Tables III and IV compare the effects of nonionic surfactants of different HLB numbers. Table IV also shows data for the case where no nonionic surfactant is present.

TABLE II

| Compound of Example 1 | | |
|---|---|---|
| Additive (PHR) | | Control |
| Methyldiethanolamine | 1.13 | |
| Diethanolamine | | 1.0 |
| Gelation Time, minutes | 3.6 | 2.1 |
| Wet Recovery[1] | Good | Good |
| Foam Properties | | |
| Density, pcf | 5.2 | 4.9 |
| Volume shrinkage, % | 38 | 31 |
| Tensile, psi | 11.9 | 4.8 |
| Elongation, % | 150 | 60 |
| Comp. Deflection, 25%, psi | 0.52 | 0.74 |
| Comp. Set, % | 11 | 22 |

[1]Tested 45 minutes after gelation.

These results show that, although good wet recovery is obtained both in the presence of methyldiethanolamine and in the presence of diethanolamine, considerably higher tensile strength and elongation at break are obtained for the cured foam made in the presence of methyldiethanolamine, according to the process of the present invention.

TABLE III

| Compound of Example 2 | | | | | | | | |
|---|---|---|---|---|---|---|---|---|
| Additive | (PHR), | HLB No., | EO[1] | | | | | |
| "Triton" X-114[2], | | 12.4 | 7–8 | 1.2 | | | | |
| "Triton" X-100[2], | | 13.5 | 9–10 | | 1.2 | | | |
| "Triton" X-102[2], | | 14.6 | 12–13 | | | 1.2 | | |
| "Triton" X-165[2], | | 15.8 | 16 | | | | 1.2 | |
| "Triton" X-305[2], | | 17.3 | 30 | | | | | 1.2* |
| Gelation Time, Minutes | | | | 4.4 | 3.9 | 3.3 | 3.9 | 4.6 |
| Foam Properties | | | | | | | | |
| Density, pcf | | | | 5.5 | 5.6 | 5.6 | 5.4 | 5.1 |
| Tensile, psi | | | | 10.2 | 9.4 | 8.8 | 8.5 | 5.7 |
| Elongation, % | | | | 150 | 145 | 140 | 140 | 70 |
| Comp. Deflect., 25%, psi | | | | 0.39 | 0.40 | 0.41 | 0.44 | 0.45 |
| Comp. Set, % | | | | 4.7 | 5.1 | 7.6 | 6.9 | 8.1 |

[1]Average number of ethylene oxide units per mole of octylphenol.
[2]"Triton" alkylaryl polyether alcohols, Rohm and Haas Co.
* Outside the scope of this invention; for comparison only.

It can be seen from the above data that in the presence of nonionic surfactants having HLB numbers within the range taught in this disclosure foams having excellent physical properties are obtained. When the HLB number exceeds the critical value, the resulting foam has a low tensile strength and low elongation at break.

TABLE IV

| Compound of Example 3 Additive | (PHR), | HLB No., | EO[1] | | | | | | |
|---|---|---|---|---|---|---|---|---|---|
| "Triton" X-100[2], | | 13.5 | 9–10 | 0.50 | 1.0 | 1.5 | 2.0 | | |
| "Triton" X-102[2], | | 14.6 | 12–13 | | | | | | 1.5 |
| Gelation Time, Minutes | | | | 2.9 | 2.8 | 2.8 | 3.3 | 3.6 | 3.7 |
| Wet Recovery[3] | | | | Ex. | Ex. | Ex. | Ex. | Ex. | Ex. |
| Foam Properties | | | | | | | | | |
| Density, pcf | | | | 4.1 | 4.5 | 4.5 | 4.6 | 4.6 | 4.9 |
| Volume Shrinkage, % | | | | 37 | 38 | 39 | 40 | 40 | 43 |
| Tensile, psi | | | | 4.8 | 8.5 | 10.3 | 12.7 | 11.6 | 12.4 |
| Elongation, % | | | | 100 | 140 | 160 | 180 | 170 | 170 |
| Comp. Deflect, 25%, psi | | | | 0.30 | 0.45 | 0.45 | 0.40 | 0.40 | 0.50 |
| Comp. Set, % | | | | 13.3 | 10.4 | 8.3 | 9.4 | 9.7 | 8.2 |

[1]Average number of ethylene oxide units per mole of octylphenol.
[2]"Triton" alkylaryl polyether alcohol, Rohm and Haas Co.
[3]Tested 45 minutes after gelation.

These results show that foams having excellent properties are obtained in the presence of a nonionic surfactant. In the absence of a surfactant, the resulting foam has a very low tensile strength and only a fair elongation at break.

I claim:

1. In a process for making a polyisocyanatemodified foam from a polychloroprene latex, said process including the step of adjusting the pH of the latex from more than about 11.5 to about 10.0–11.5, the improvement of adding to the neoprene latex, prior to the polyisocyanate addition, at least 0.5 part of a nonionic surfactant having a hydrophilic-lipophilic balance of about 11–16.5 and about 0.5–2.0 parts of an amine having the formula $$RN(CH_2CHR'OH)_2$$

wherein

R is methyl or ethyl, and

R' is hydrogen or methyl;

and adjusting the pH of the latex to the desired range; all parts being per hundred parts by weight of latex solids.

2. The process of claim 1 wherein the amine is methyldiethanolamine.

3. The process of claim 1 wherein the amine is ethyldiethanolamine.

4. The process of claim 1 wherein the latex is a directly polymerized high solids latex.

5. The improvement of claim 1 wherein the nonionic surfactant is added in an amount of up to about 3 parts by weight per hundred parts of latex solids.

6. The improvement of claim 1 wherein addition of the amine and pH adjustment are combined into a single step.

7. The improvement of claim 6 wherein a preformed amine salt is added to the latex.

8. The improvement of claim 7 wherein the salt is methyldiethanolammonium chloride, or ethyldiethanolammonium chloride.

* * * * *